United States Patent
Chai et al.

(10) Patent No.: US 10,266,627 B2
(45) Date of Patent: Apr. 23, 2019

(54) METHOD OF PREPARING HEAT-RESISTANT SAN RESIN

(71) Applicant: LG CHEM, LTD., Seoul (KR)

(72) Inventors: Joo Byung Chai, Daejeon (KR); Yu Sung Jung, Daejeon (KR); Jong Beom Kim, Daejeon (KR); Chang Sull Kim, Daejeon (KR); Young Min Kim, Daejeon (KR); Eun Seon Park, Daejeon (KR); Tae Young Jeon, Daejeon (KR)

(73) Assignee: LG CHEM, LTD., Seoul (KR)

( * ) Notice: Subject to any disclaimer, the term of this patent is extended or adjusted under 35 U.S.C. 154(b) by 39 days.

(21) Appl. No.: 15/560,897

(22) PCT Filed: Nov. 29, 2016

(86) PCT No.: PCT/KR2016/013824
§ 371 (c)(1),
(2) Date: Sep. 22, 2017

(87) PCT Pub. No.: WO2017/095099
PCT Pub. Date: Jun. 8, 2017

(65) Prior Publication Data
US 2018/0118864 A1    May 3, 2018

(30) Foreign Application Priority Data

Dec. 4, 2015  (KR) .................. 10-2015-0172718
Nov. 28, 2016 (KR) .................. 10-2016-0159007

(51) Int. Cl.
| C08F 212/10 | (2006.01) |
| C08F 212/12 | (2006.01) |
| C08J 3/16 | (2006.01) |
| C08L 9/06 | (2006.01) |

(52) U.S. Cl.
CPC .......... C08F 212/10 (2013.01); C08F 212/12 (2013.01); C08J 3/16 (2013.01); C08L 9/06 (2013.01); *C08F 2800/20* (2013.01); *C08J 2325/12* (2013.01)

(58) Field of Classification Search
CPC ........ C08F 212/12; C08F 212/10; C08F 2/22; C08F 4/40; C08F 4/34; C08F 2500/20; C08J 3/16; C08J 2325/12; C08L 9/06
See application file for complete search history.

(56) References Cited

U.S. PATENT DOCUMENTS

| 4,294,946 A | * | 10/1981 | Minennatsu et al. ...... C08F 212/12 525/242 |
| 5,171,814 A | * | 12/1992 | Mathunnoto et al. ...... C08F 212/12 526/329.2 |
| 5,326,836 A | | 7/1994 | Hwang et al. |
| 2017/0355847 A1 | * | 12/2017 | Zhou et al. ......... C08L 23/0869 |

FOREIGN PATENT DOCUMENTS

| JP | S5578007 A | 6/1980 |
| JP | S578208 A | 1/1982 |
| KR | 10-1993-0021665 A | 11/1993 |
| KR | 10-1996-0031486 A | 9/1996 |
| KR | 10-0236773 B1 | 1/2000 |
| KR | 10-2002-0048605 A | 6/2002 |
| KR | 10-0417061 B1 | 2/2004 |
| KR | 10-2015-0004249 A | 1/2015 |
| KR | 10-2015-0037459 A | 4/2015 |
| KR | 10-2015-0037460 A | 4/2015 |

OTHER PUBLICATIONS

International Search Report for PCT/KR2016/013824 filed on Nov. 29, 2016.
Motoki Okaniwa et al., "Novel Emulsion Graft Copolymerization onto the Silylmethyl Group of Poly(dimethylsiloxane)", XP-000721381, Jan. 31, 1997, pp. 2607-2617.

* cited by examiner

*Primary Examiner* — Nathan M Nutter

(57) ABSTRACT

The present disclosure relates to a method of preparing a heat-resistant SAN resin. More particularly, the present disclosure provides a method of preparing a heat-resistant SAN resin enabling provision of superior productivity and improved heat resistance and fluidity without generation of odor during processing, and a heat-resistant SAN resin composition prepared by the method.

20 Claims, No Drawings

METHOD OF PREPARING HEAT-RESISTANT SAN RESIN

CROSS-REFERENCE TO RELATED APPLICATIONS

This application is a U.S. National Stage of International Application No. PCT/KR2016/013824 filed Nov. 29, 2016, which claims the priority benefit of Korean Patent Application No. 10-2015-0172718, filed on Dec. 04, 2015, and Korean Patent Application No. 10-2016-0159007, filed on Nov. 28, 2016, in the Korean Intellectual Property Office. Each of the above application(s) is hereby expressly incorporated by reference, in its entirety, into the present application.

TECHNICAL FIELD

The present disclosure relates to a method of preparing a heat-resistant SAN resin. More particularly, the present disclosure relates to a method of preparing a heat-resistant SAN resin enabling provision of superior productivity and improved heat resistance and fluidity without generation of odor during processing, and a heat-resistant SAN resin composition prepared by the method.

BACKGROUND ART

To increase heat resistance of acrylonitrile-butadiene-styrene (hereinafter referred to as "ABS") resin, a method of substituting a portion or the entirety of styrene with α-methyl styrene and using emulsion polymerization has been generally used. A heat-resistant SAN resin is prepared based on α-methyl styrene. When such a heat-resistant SAN resin is prepared using emulsion polymerization, high glass transition temperature and high molecular weight may be obtained compared to bulk polymerization, whereby superior heat resistance and environmental stress cracking resistance (ESCR) are exhibited. In particular, to adjust glass transition temperature as an important factor determining heat resistance of a heat-resistant resin, the content of α-methyl styrene is increased or molecular weight is increased. When the content of α-methyl styrene is increased, reactivity of α-methyl styrene per se is low and thus a proportion of unreacted monomers increases, which causes heat resistance deterioration. In addition, since a separate device for removing unreacted monomers is required, product costs increase, productivity is decreased, polymerization time increases, and a conversion rate is decreased. In addition, when molecular weight is increased, fluidity of a final product is decreased, whereby there may be limitations in increasing molecular weight. Further, when molecular weight is decreased by increasing the content of molecular weight adjuster to improve fluidity, odor may be generated during processing of a mercaptan mainly used as a molecular weight adjuster.

To address these problems, KR 10-1993-0021665 A discloses a method of emulsion-polymerizing an α-alkyl styrene-acrylonitrile copolymer to prepare a heat-resistant SAN copolymer. However, when this method is used, a long polymerization time of nine hours or more is required, whereby copolymer productivity is decreased.

In addition, KR 10-1996-0031486 A discloses a method of adding an electrolyte to prepare a heat-resistant SAN copolymer having a high latex solid content and superior stability using emulsion polymerization. However, this method also requires a long polymerization time of six hours or more, whereby copolymer productivity is decreased.

DISCLOSURE

Technical Problem

Therefore, the present invention has been made in view of the above problems, and it is one object of the present invention to provide a method of preparing a heat-resistant SAN resin enabling provision of superior productivity and improved heat resistance and fluidity without generation of odor during processing, and a heat-resistant SAN resin composition prepared by the method.

The above and other objects can be accomplished by the present disclosure described below.

Technical Solution

In accordance with one aspect of the present invention, provided is a method of preparing a heat-resistant SAN resin enabling provision of superior productivity and improved heat resistance and fluidity without generation of odor during processing, wherein the heat-resistant SAN resin is prepared by polymerizing an α-methyl styrene monomer with a vinyl cyanide monomer, the method including: (i) a first polymerization step of polymerizing a total weight of α-methyl styrene monomer with a portion of the vinyl cyanide monomer in the presence of an oxidation-reduction catalyst and hydroperoxide-based initiator while continuously adding another portion of the vinyl cyanide monomer upon or after initiation of the polymerization; (ii) a second polymerization step of adding and polymerizing an oxidation-reduction catalyst and a hydroperoxide-based initiator when a polymerization conversion rate reaches 25 to 40% in the first polymerization step; and (iii) a third polymerization step of adding and polymerizing the remainder of the vinyl cyanide monomer and a thermal decomposition initiator when a polymerization conversion rate reaches 80 to 90% in the second polymerization step.

In accordance with another aspect of the present invention, there is provided a heat-resistant SAN resin composition according to the method.

Advantageous Effects

As apparent from the fore-going, the present invention advantageously provides a method of preparing a heat-resistant SAN resin enabling provision of superior productivity and improved heat resistance and fluidity without generation of odor during processing, and a heat-resistant SAN resin composition prepared by the method.

BEST MODE

Hereinafter, the present disclosure id described in detail.

The present disclosure relates to a method of preparing a heat-resistant SAN resin, wherein the heat-resistant SAN resin is prepared by polymerizing an α-methyl styrene monomer with a vinyl cyanide monomer, the method including: (i) a first polymerization step of polymerizing a total weight of α-methyl styrene monomer with a portion of the vinyl cyanide monomer in the presence of an oxidation-reduction catalyst and hydroperoxide-based initiator while continuously adding another portion of the vinyl cyanide monomer upon or after initiation of the polymerization; (ii) a second polymerization step of adding and polymerizing an oxidation-reduction catalyst and a hydroperoxide-based initiator when a polymerization conversion rate reaches 25 to 40% in the first polymerization step; and (iii) a third polymerization step of adding and polymerizing the remainder of the vinyl cyanide monomer and a thermal decomposition initiator when a polymerization conversion rate reaches 80 to 90% in the second polymerization step. Within this range, a heat-resistant SAN resin enabling provision of superior productivity and improved heat resistance and fluidity without generation of odor during processing may be prepared.

In another embodiment, in the method of the present disclosure, a heat-resistant SAN resin is prepared by polymerizing an α-methyl styrene monomer with a vinyl cyanide monomer, the method including: (i) a first polymerization step of polymerizing a total weight of α-methyl styrene monomer with 20 to 65% by weight of 100% by weight of the vinyl cyanide monomer in the presence of an oxidation-reduction catalyst and hydroperoxide-based initiator while continuously adding 30 to 80% by weight or 30 to 79% by weight of 100% by weight of the vinyl cyanide monomer upon or after initiation of the polymerization; (ii) a second polymerization step of adding and polymerizing an oxidation-reduction catalyst and a hydroperoxide-based initiator when a polymerization conversion rate reaches 25 to 40% in the first polymerization step; and (iii) a third polymerization step of adding and polymerizing 0 to 25% by weight or 1 to 25% by weight of 100% by weight of the vinyl cyanide monomer and a thermal decomposition initiator when a polymerization conversion rate reaches 80 to 90% in the second polymerization step. Within this range, a heat-resistant SAN resin enabling provision of superior productivity and improved heat resistance and fluidity without generation of odor during processing may be prepared.

In another embodiment, in the method of the present disclosure, a heat-resistant SAN resin is prepared by polymerizing an α-methyl styrene monomer with a vinyl cyanide monomer, the method including: (i) a first polymerization step of polymerizing a total weight of α-methyl styrene monomer with 30 to 60% by weight or 33 to 40% by weight of 100% by weight of the vinyl cyanide monomer in the presence of an oxidation-reduction catalyst and hydroperoxide-based initiator while continuously adding 30 to 60% by weight or 50 to 56% by weight of 100% by weight of the vinyl cyanide monomer upon or after initiation of the polymerization; (ii) a second polymerization step of adding and polymerizing an oxidation-reduction catalyst and a hydroperoxide-based initiator when a polymerization conversion rate reaches 25 to 40% in the first polymerization step; and (iii) a third polymerization step of adding and polymerizing 5 to 15% by weight or 4 to 17% by weight of 100% by weight of the vinyl cyanide monomer and a thermal decomposition initiator when a polymerization conversion rate reaches 80 to 90% in the second polymerization step. Within this range, a heat-resistant SAN resin enabling provision of superior productivity and improved heat resistance and fluidity without generation of odor during processing may be prepared.

The vinyl cyanide monomer continuously added in step (i) may be continuously added, for example, for 30 minutes to 5 hours, for 1 hour to 4 hours, for 2 hours to 3.5 hours, or for 2 hours to 3 hours after addition of the initiator or after polymerization initiation. Within this range, a heat-resistant SAN resin enabling provision of superior productivity and improved heat resistance and fluidity without generation of odor during processing may be prepared.

In another embodiment, the vinyl cyanide monomer continuously added in step (i) may be continuously added until a polymerization conversion rate reaches 20 to 90%, 40 to 90%, 60 to 90% or 70 to 88% after addition of the initiator or after polymerization initiation. Within this range, a heat-resistant SAN resin enabling provision of superior productivity and improved heat resistance and fluidity without generation of odor during processing may be prepared.

In the present disclosure, the expression "after polymerization initiation" or "after addition of an initiator" refers to a time interval within which those of ordinary skill can immediately add a substance after polymerization initiation. As a particular example, the expression may refer to a time point of 1 second to 10 minutes or 10 seconds to 5 minutes after polymerization initiation or a time point at which a polymerization conversion rate reaches greater than 0% and 5% or less or greater than 0% and 3% or less.

Continuous addition used in the present disclosure is not specifically limited so long as it is a method generally known in the art. For example, the continuous addition may refer to a method of continuously adding a material for a predetermined time without interruption, or a method of continuously adding droplets for a predetermined time at a short time interval in a drop-by-drop manner.

The method may include, based on 100 parts by weight of a sum of the α-methyl styrene monomer and the vinyl cyanide monomer, i) a first polymerization step of adding batchwise and polymerizing 65 to 75 parts by weight of α-methyl styrene, 5 to 15 parts by weight of a vinyl cyanide monomer, 0.01 to 0.3 parts by weight of a molecular weight adjuster, 0.01 to 1.0 part by weight of an oxidation-reduction catalyst, 0.001 to 0.2 parts by weight of a hydroperoxide-based initiator, and 1.5 to 2.0 parts by weight of an emulsifier while continuously adding an emulsion including 10 to 20 parts by weight of a vinyl cyanide monomer, 0.5 to 1.0 part by weight of an emulsifier, and 0 to 0.2 parts by weight of a molecular weight adjuster upon or after initiation of the polymerization; ii) a second polymerization step of adding and polymerizing 0.01 to 1.0 part by weight of an oxidation-reduction catalyst and 0.01 to 2 parts by weight of a hydroperoxide-based initiator when a polymerization conversion rate reaches 25 to 40% in the first polymerization step; and iii) a third polymerization step of adding and polymerizing 0 to 4 parts by weight of a vinyl cyanide monomer, 0.01 to 0.3 parts by weight of a thermal decomposition initiator, and 0.1 to 0.5 parts by weight of an emulsifier when a polymerization conversion rate reaches 80 to 90% in the second polymerization step.

In step (i), the hydroperoxide-based initiator along with the oxidation-reduction catalyst may be added, for example, in an amount of 0.01 to 1.0 part by weight, 0.03 to 0.5 parts by weight, or 0.05 to 0.3 parts by weight. Within this range, a polymerization time is shortened and a high molecular weight may be provided although polymerization is carried out at low temperature. Here, an example of an applicable oxidation-reduction catalyst includes one or more selected from the group consisting of ferrous sulfate, dextrose, sodium pyrophosphate, sodium sulfite, sodium formaldehyde sulfoxylate, and sodium ethylenediamine tetraacetate.

The heat-resistant SAN resin refers to a copolymer resin of an α-methyl styrene monomer-vinyl cyanide compound.

The vinyl cyanide monomer may be, for example, one or more selected from the group consisting of acrylonitrile, methacrylonitrile, and ethacrylonitrile.

The amount of the vinyl cyanide monomer added batchwise in the first polymerization step (i) may be, for example, 5 to 15 parts by weight, or 7 to 13 parts by weight. Within this range, an initial reaction rate is proper, whereby molecular weight may be easily controlled, and glass transition temperature may be increased while shortening a polymerization time.

A weight ratio of the vinyl cyanide monomer added batchwise in the first polymerization step (i) to the α-methyl styrene monomer is 0.05 to 0.15 may be, for example, 0.05 to 0.15, or 0.1 to 0.13. Within this range, glass transition temperature may be increased while shortening a polymerization time.

The oxidation-reduction catalyst may be, for example, one or more selected from the group consisting of ferrous sulfate, dextrose, sodium pyrophosphate, sodium sulfite, sodium formaldehyde sulfoxylate, and sodium ethylenediamine tetraacetate.

The amount of the oxidation-reduction catalyst added in the first polymerization step (i) may be, for example, 0.01 to 1.0 part by weight, 0.03 to 0.5 parts by weight, or 0.05 to 0.3 parts by weight. Within this range, a high molecular weight may be provided while shortening a polymerization time although polymerization is carried out at low temperature.

As a particular example, the oxidation-reduction catalyst added in the first polymerization step (i) may be dextrose, sodium pyrophosphate, and ferrous sulfate; or sodium ethylenediamine tetraacetate, sodium formaldehyde sulfoxylate, and ferrous sulfate. Within this range, a high molecular weight may be provided while shortening a polymerization time although polymerization is carried out at low temperature.

The amount of the oxidation-reduction catalyst added in the second polymerization step (ii) may be, for example, 0.01 to 1.0 part by weight, 0.03 to 0.5 parts by weight, or 0.05 to 0.3 parts by weight. Within this range, a high molecular weight may be provided while shortening a polymerization time although polymerization is carried out at low temperature.

As a particular example, the oxidation-reduction catalyst added in the second polymerization step (ii) may be dextrose, sodium pyrophosphate, and ferrous sulfate; or sodium ethylenediamine tetraacetate, sodium formaldehyde sulfoxylate, and ferrous sulfate. Within this range, a high molecular weight may be provided while shortening a polymerization time although polymerization is carried out at low temperature.

The hydroperoxide-based initiator may be, for example, one or more selected from the group consisting of diisopropylbenzene hydroperoxide, cumene hydroperoxide, and tertiary butyl hydroperoxide.

The amount of the hydroperoxide-based initiator added in the first polymerization step (i) may be, for example, 0.001 to 0.2 parts by weight, 0.005 to 0.15 parts by weight, or 0.01 to 0.1 parts by weight. Within this range, a polymerization conversion rate may increase.

The amount of the hydroperoxide-based initiator added in the second polymerization step (ii) may be, for example, 0.01 to 2 parts by weight, 0.01 to 1 parts by weight, or 0.02 to 0.5 parts by weight. Within this range, a polymerization conversion rate may increase.

The thermal decomposition initiator may be, for example, one or more selected from the group consisting of ammonium persulfate, sodium persulfate, and potassium persulfate.

In an embodiment, the thermal decomposition initiator may be included in only the third polymerization step (iii). In another embodiment, the amount of the thermal decomposition initiator may be 0.01 to 0.3 parts by weight, 0.05 to 0.25 parts by weight, or 0.1 to 0.2 parts by weight. Within this range, a final polymerization conversion rate may increase.

The molecular weight adjuster may be, for example, one or more selected from the group consisting of n-dodecyl mercaptan, tertiary dodecyl mercaptan, n-tetradecyl mercaptan, and tertiary tetradecyl mercaptan.

The amount of the molecular weight adjuster added batchwise in the first polymerization step (i) may be, for example, 0.001 to 0.3 parts by weight, 0.1 to 0.25 parts by weight, or 0.1 to 0.2 parts by weight. Within this range, superior fluidity is provided without generation of odor during processing.

The amount of the molecular weight adjuster included in the emulsion of the first polymerization step (i) may be, for example, 0 to 0.2 parts by weight, 0.01 to 0.2 parts by weight, or 0.1 to 0.2 parts by weight. Within this range, superior fluidity is provided without generation of odor during process.

In another embodiment, the molecular weight adjuster included in the emulsion of the first polymerization step (i) may be excluded. Within this case, odor is not generated during processing.

The amount of the vinyl cyanide included in the emulsion of the first polymerization step (i) may be, for example, 10 to 18 parts by weight or 11 to 15 parts by weight. Within this range, an initial reaction rate is proper, whereby molecular weight may be easily controlled, and glass transition temperature may be increased while shortening a polymerization time.

The emulsifier may be, for example, an anionic emulsifier having an allyl group, a (meth)acryloyl group, or a propenyl group or a neutral polymer-type emulsifier.

The emulsion continuously added in the first polymerization step (i) may be added until a polymerization conversion rate reaches 25 to 90%, 30 to 90%, 50 to 90%, or 80 to 90%. Within this range, polymerization stability may be improved and a heat-resistant SAN resin having a high molecular weight may be prepared.

The emulsion continuously added in the first polymerization step (i) may be added at a rate of 1 to 20 parts by weight/hr, 2 to 16 parts by weight/hr, or 3 to 5 parts by weight/hr based on a total weight of the vinyl cyanide monomer, emulsifier, and molecular weight adjuster included in the emulsion. Within this range, polymerization stability may be improved and a heat-resistant SAN resin having a high molecular weight may be prepared.

The adding batchwise in the first polymerization step (i) may be carried out, for example, at 45 to 55° C. Within this range, polymerization may be efficiently carried out also at low temperature, and thus, production efficiency may be improved.

In the first polymerization step (i), the emulsion may be continuously added, for example, at 60 to 70° C. while maintaining ΔT (set temperature-exothermic temperature) at less than 4° C.

A general heat-resistant SAN resin is emulsion-polymerized at a reaction temperature, i.e., a set temperature, of 75 to 85° C. However, although the heat-resistant SAN resin of the present invention is polymerized at a lower temperature, i.e., a set temperature of 65 to 75° C., glass transition temperature may be increased while shortening a polymerization time.

ΔT (set temperature-exothermic temperature) may be, for example, less than 4° C., or 2° C. or less. Within this range, polymerization stability may be improved and a heat-resistant SAN resin having a high molecular weight may be prepared.

In the second polymerization step (ii) polymerization may be carried out, for example, at a reaction temperature of 65 to 75° C. Within this range, polymerization stability is improved.

The polymerization in the second polymerization step (ii) may be carried out at a reaction temperature of 65 to 75° C. Within this range, a balance between a polymerization rate and molecular weight increase is superior.

The polymerization conversion rate of the third polymerization step (iii) may be, for example, 80 to 90%, or 85 to 90%. Within this range, glass transition temperature may be increased, whereby heat resistance may be increased.

The amount of water added batchwise in the first polymerization step (i) may be, for example, 100 to 500 parts by weight, 100 to 300 parts by weight, or 130 to 250 parts by weight based on 100 parts by weight of a total of the monomers.

The amount of water included in the emulsion of the first polymerization step (i) may be, for example, 50 to 300 parts by weight, 50 to 200 parts by weight, 70 to 150 parts by weight, or 80 to 120 parts by weight based on 100 parts by weight of a total of the monomers.

The third polymerization step (iii) may be terminated, for example, when a polymerization conversion rate is 97% or more or 97 to 99%.

After the third polymerization step (iii), for example, a step of coagulating by adding 1 to 3 parts by weight of a coagulant may be included.

After the step of the coagulating, for example, a drying step; or drying and aging steps may be included.

The drying step may be carried out, for example, by means of a hot air fluid bed dryer.

After completing the drying step; or the drying and aging steps, a heat-resistant SAN resin may be prepared, for example, in a powder form having a water content of 1% by weight or less.

The heat-resistant SAN resin may have, for example, a weight average molecular weight of 60,000 to 150,000 g/mol, 70,000 to 130,000 or 80,000 to 120,000 g/mol. Within this range, glass transition temperature and heat deflection temperature increase.

The heat-resistant SAN resin may have, for example, a glass transition temperature of 140° C. or more or 140 to 150° C. Within this range, superior heat resistance is exhibited.

The sum of a vinyl cyanide monomer-vinyl cyanide monomer-α-methyl styrene copolymer and a vinyl cyanide monomer-vinyl cyanide monomer-vinyl cyanide monomer copolymer, which is analyzed by NMR, in the heat-resistant SAN resin may be, for example, 10% by weight or less, 8% by weight or less, or 1 to 7% by weight. Within this range, superior heat resistance is exhibited.

A heat-resistant SAN resin composition according to the present disclosure may include, for example, 20 to 30 parts by weight of a heat-resistant SAN resin prepared by the method and 70 to 80 parts by weight of a vinyl cyanide compound-conjugated diene compound-aromatic vinyl compound copolymer resin.

The conjugated diene compound may be, for example, one or more selected from the group consisting of 1,3-butadiene, 2,3-dimethyl-1,3-butadiene, 2-ethyl-1,3-butadiene, 1,3-pentadiene, and isoprene.

The aromatic vinyl compound may be, for example, one or more selected from the group consisting of styrene, α-methyl styrene, o-ethyl styrene, p-ethyl styrene, and vinyl toluene.

The heat-resistant SAN resin composition may further include, for example, one or more selected from the group consisting of an antimicrobial agent, a heat stabilizer, an antioxidant, a releasing agent, a light stabilizer, a surfactant, a coupling agent, a plasticizer, an admixture, a tint, a stabilizer, a lubricant, an antistatic agent, a colorant, a flame retardant, a weather-resistant agent, an ultraviolet absorber, and a sunscreen.

Now, the present invention will be described in more detail with reference to the following preferred examples. It is obvious to those of ordinary skill in the art that these examples are provided for illustrative purposes only and should not be construed as limiting the scope and spirit of the present invention. In addition, those of ordinary skill in the art may carry out a variety of applications and modifications based on the foregoing teachings within the scope of the present invention, and these modified embodiments may also be within the scope of the present invention.

EXAMPLE

Example 1

150 parts by weight of ion exchanged water, 73 parts by weight of α-methyl styrene, 9 parts by weight of acrylonitrile, 2.0 parts by weight of potassium stearate, and 0.2 parts by weight of tertiary dodecyl mercaptan were fed into a reactor substituted with nitrogen, and were stirred therein at 50° C. for 30 minutes. Subsequently, an oxidation-reduction catalyst composed of 0.02 parts by weight of t-butyl hydroperoxide, 0.035 parts by weight of dextrose, 0.06 parts by weight of sodium pyrophosphate, and 0.0015 parts by weight of ferrous sulfate was added thereto batchwise, and then an emulsion composed of 100 parts by weight of ion exchanged water, 15 parts by weight of acrylonitrile, and 1.0 part by weight of potassium stearate was continuously added thereto over a period of 1.0 hour while adjusting ΔT (set temperature-exothermic temperature) to 1° C. or less at a set reaction temperature of 65° C. Additional polymerization was carried out while elevating temperature to 70° C. over a period of 2.5 hours (while continuing addition of the emulsion). At one hour after initiation of the polymerization (at a polymerization conversion rate of 30%), an oxidation-reduction catalyst composed of 0.04 parts by weight of t-butyl hydroperoxide, 0.035 parts by weight of dextrose, 0.06 parts by weight of sodium pyrophosphate, and 0.0015 parts by weight of ferrous sulfate was added batchwise thereto. When the emulsion was completely added (at a polymerization conversion rate of 88%), 3 parts by weight of acrylonitrile and 0.15 parts by weight of potassium persulfate were added batchwise thereto and polymerized while elevating a reaction temperature to 75° C. over a period of 30 minutes.

Example 2

An experiment was carried out in the same manner as in Example 1, except that 75 parts by weight of α-methyl styrene and 9 parts by weight of acrylonitrile were added batchwise upon polymerization initiation and, in the step of continuously adding the emulsion, an emulsion including 13 parts by weight of acrylonitrile was continuously added.

Reference Example 1

An experiment was carried out in the same manner as in Example 1, except that 73 parts by weight of α-methyl styrene and 15 parts by weight of acrylonitrile were added batchwise upon polymerization initiation, an emulsion including 9 parts by weight of acrylonitrile was added in the step of continuously adding the emulsion, and ΔT (set temperature-exothermic temperature) was not adjusted to less than 4° C. when the emulsion was continuously added for a period of 1 hour.

Comparative Example 1

An experiment was carried out in the same manner as in Example 1, except that potassium persulfate, as a thermal decomposition initiator, was added instead of the hydroperoxide-based initiator at the initial stage of the polymerization and at one hour after polymerization time and an initial polymerization temperature was 70° C.

Comparative Example 2

An experiment was carried out in the same manner as in Comparative Example 1, except that tertiary mercaptan, as a molecular weight adjuster, was used in an amount of 0.6 parts by weight.

Test Example

The properties of the heat-resistant SAN resin compositions prepared according to Examples 1 to 2, Reference Example 1, and Comparative Examples 1 to 2 were measured according to the following methods. Results are summarized in Table 1 below.

Polymerization conversion rate (%): 1.5 g of a prepared latex was dried for 15 minutes in a 150° C. hot air dryer, and then the weight thereof was measured to find a total solid content (TSC). A polymerization conversion rate was calculated according to Mathematical Equation 1 below:

Polymerization conversion rate (%)=[{(Parts by weight of added monomers and supplementary materials)total solid content (%)−(parts by weight of added supplementary materials except for monomers)}/(total parts by weight of added monomers)]*100    [Mathematical Equation 1]

(In the case of a sectional polymerization conversion rate, parts by weight of monomers added until a corresponding section were reflected)

Weight average molecular weight (g/mol): A sample was dissolved in tetrahydrofuran (THF), and the weight average molecular weight thereof was measured using GPC.

Glass transition temperature (° C.): Measured using a DSC Q100 (manufactured by TA Instruments).

Triad content (% by weight): A Bruker AVANCE HD III 700 MHz NMR spectrometer was used and a sample was dissolved in CDCl3 (w/TMS). NMR spectrum was measured at room temperature. TMS was calibrated at 0 ppm, and a triad sequence distribution was calculated based on a peak integral at regions of 150 to 140 ppm and 125 to 118 ppm. In addition, the content of a vinyl cyanide monomer-vinyl cyanide monomer-α-methyl styrene copolymer and a vinyl cyanide monomer-vinyl cyanide monomer-vinyl cyanide monomer copolymer was measured.

Odor during processing: Odor generated during extrusion and injection molding was determined by sensory evaluation. When order was not generated, it was evaluated as satisfactory. On the other hand, when odor was generated, it was evaluated as disgusting.

Fluidity (g/10 min): Measured under a load of 10 Kg at 220° C. for 10 minutes according to ASTM D1238.

Heat deflection temperature (° C.): Measured according to ASTM D648.

TABLE 1

| Classification | | Example 1 | Example 2 | Reference Example 1 | Comparative Example 1 | Comparative Example 2 |
|---|---|---|---|---|---|---|
| First polymerization step (Batch addition) | α-methyl styrene | 73 | 75 | 73 | 73 | 73 |
| | Acrylonitrile | 9 | 9 | 15 | 9 | 9 |
| | tDDM | 0.2 | 0.2 | 0.2 | 0.2 | 0.6 |
| | Initiator | t-BHP as oxidation-reduction catalyst | t-BHP as oxidation-reduction catalyst | t-BHP as oxidation-reduction catalyst | Potassium persulfate | Potassium persulfate |
| | Polymerization temperature | 65 | 65 | 65 | 70 | 70 |
| Second polymerization step (continuously adding) | Acrylonitrile | 15 | 11 | 9 | 15 | 15 |
| | Initiator | t-BHP as oxidation-reduction catalyst | t-BHP as oxidation-reduction catalyst | t-BHP as oxidation-reduction catalyst | Potassium persulfate | Potassium persulfate |
| | Conversion rate | 88 | 85 | 86 | 80 | 78 |
| | ΔT | ≤2° C. | ≤1° C. | 4° C. | 6° C. | 6° C. |
| Third | Acrylonitrile | 3 | 2 | 3 | 3 | 3 |

TABLE 1-continued

| Classification | Example 1 | Example 2 | Reference Example 1 | Comparative Example 1 | Comparative Example 2 |
|---|---|---|---|---|---|
| polymerization step (Batch addition) | | | | | |
| Final conversion rate | 98.5 | 98.0 | 98.0 | 97.0 | 97.0 |
| Weight average molecular weight | 120,000 | 100,000 | 200,000 | 180,000 | 120,000 |
| Glass transition temperature | 140 | 143 | 137 | 135 | 129 |
| Triad | 5 | 4 | 12 | 14 | 14 |
| Order during processing | Satisfactory | Satisfactory | Satisfactory | Satisfactory | Disgusting |
| Fluidity | 7.2 | 7.8 | 4.5 | 4.8 | 7.5 |
| Heat deflection temperature | 107 | 106 | 103 | 102 | 99 |

*T-BHP: t-butyl hydroperoxide

As shown in Table 1, in the case of Examples 1 and 2 according to the present disclosure, odor was not generated during processing and a polymer having a weight average molecular weight of 100,000 g/mol or more was generated. In addition, in the case of Examples 1 and 2 according to the present disclosure, glass transition temperature and heat deflection temperature were increased due to a low triad content, whereby superior heat resistance and satisfactory fluidity were exhibited.

On the other hand, in the case of Reference Example 1 in which ΔT (set temperature-exothermic temperature) was not adjusted to less than 4° C., a weight average molecular weight increased, but glass transition temperature, heat deflection temperature, and fluidity were decreased, during the second polymerization step.

In addition, in the cases of Comparative Examples 1 and 2 in which an oxidation-reduction catalyst was not used, decrease widths in glass transition temperature and heat deflection temperature greatly increased and a triad content rapidly increased.

The invention claimed is:

1. A method of preparing a heat-resistant SAN resin, wherein the heat-resistant SAN resin is prepared by polymerizing an α-methyl styrene monomer with a vinyl cyanide monomer,
the method comprising:
(i) a first polymerization step of polymerizing a total weight of α-methyl styrene monomer with 20 to 65% by weight of 100% by weight of the vinyl cyanide monomer in the presence of an oxidation-reduction catalyst and hydroperoxide-based initiator while continuously adding 30 to 80% by weight of 100% by weight of the vinyl cyanide monomer upon or after initiation of the polymerization;
(ii) a second polymerization step of adding and polymerizing an oxidation-reduction catalyst and a hydroperoxide-based initiator when a polymerization conversion rate reaches 25 to 40% in the first polymerization step; and
(iii) a third polymerization step of adding and polymerizing 0 to 25% by weight of 100% by weight of the vinyl cyanide monomer and a thermal decomposition initiator when a polymerization conversion rate reaches 80 to 90% in the second polymerization step.

2. The method according to claim 1, the method comprising: based on 100 parts by weight of a sum of the α-methyl styrene monomer and the vinyl cyanide monomer,
i) a first polymerization step of adding batchwise and polymerizing 65 to 75 parts by weight of α-methyl styrene, 5 to 15 parts by weight of a vinyl cyanide monomer, 0.01 to 0.3 parts by weight of a molecular weight adjuster, 0.01 to 1.0 part by weight of an oxidation-reduction catalyst, 0.001 to 0.2 parts by weight of a hydroperoxide-based initiator, and 1.5 to 2.0 parts by weight of an emulsifier while continuously adding an emulsion comprising 10 to 20 parts by weight of a vinyl cyanide monomer, 0.5 to 1.0 part by weight of an emulsifier, and 0 to 0.2 parts by weight of a molecular weight adjuster upon or after initiation of the polymerization;
ii) a second polymerization step of adding and polymerizing 0.01 to 1.0 part by weight of an oxidation-reduction catalyst and 0.01 to 2 parts by weight of a hydroperoxide-based initiator when a polymerization conversion rate reaches 25 to 40% in the first polymerization step; and
iii) a third polymerization step of adding and polymerizing 0 to 4 parts by weight of a vinyl cyanide monomer, 0.01 to 0.3 parts by weight of a thermal decomposition initiator, and 0.1 to 0.5 parts by weight of an emulsifier when a polymerization conversion rate reaches 80 to 90% in the second polymerization step.

3. The method according to claim 2, wherein a weight ratio of the vinyl cyanide monomer added batchwise in the first polymerization step (i) to the α-methyl styrene monomer is 0.05 to 0.15.

4. The method according to claim 1, wherein the oxidation-reduction catalyst is one or more selected from the group consisting of ferrous sulfate, dextrose, sodium pyrophosphate, sodium sulfite, sodium formaldehyde sulfoxylate, and sodium ethylenediamine tetraacetate.

5. The method according to claim 1, wherein the hydroperoxide-based initiator is one or more selected from the group consisting of diisopropylbenzene hydroperoxide, cumene hydroperoxide, and tertiary butyl hydroperoxide.

6. The method according to claim 1, wherein the thermal decomposition initiator is one or more selected from the group consisting of ammonium persulfate, sodium persulfate, and potassium persulfate.

7. The method according to claim 2, wherein the emulsion continuously added in the first polymerization step (i) is added until a polymerization conversion rate reaches 20 to 90%.

8. The method according to claim 2, wherein the emulsion continuously added in the first polymerization step (i) is added at a rate of 1 to 20 parts by weight/hr based on a total weight of the vinyl cyanide monomer, emulsifier, and molecular weight adjuster comprised in the emulsion.

9. The method according to claim 1, wherein the vinyl cyanide monomer is one or more selected from the group consisting of acrylonitrile, methacrylonitrile, and ethacrylonitrile.

10. The method according to claim 2, wherein the adding batchwise in the first polymerization step (i) is carried out at 45 to 55° C.

11. The method according to claim 2, wherein, in the first polymerization step (i), the emulsion is continuously added at 60 to 70° C. while maintaining ΔT (set temperature-exothermic temperature) at less than 4° C.

12. The method according to claim 1, wherein the polymerization in the second polymerization step (ii) is carried out at a reaction temperature of 65 to 75° C.

13. The method according to claim 2, wherein the molecular weight adjuster is one or more selected from the group consisting of n-dodecyl mercaptan, tertiary dodecyl mercaptan, n-tetradecyl mercaptan, and tertiary tetradecyl mercaptan.

14. The method according to claim 2, wherein the emulsifier is an anionic emulsifier having an allyl group, a (meth)acryloyl group, or a propenyl group or a neutral polymer-type emulsifier.

15. The method according to claim 1, comprising, after the third polymerization step (iii), a step of coagulating by adding 1 to 3 parts by weight of a coagulant.

16. The method according to claim 15, further comprising, after the step of the coagulating, drying and aging steps; or a drying step.

17. The method according to claim 1, wherein the heat-resistant SAN resin has a weight average molecular weight of 80,000 to 120,000 g/mol.

18. The method according to claim 1, wherein the heat-resistant SAN resin has a glass transition temperature of 140° C. or more.

19. The method according to claim 1, wherein a sum of a vinyl cyanide monomer-vinyl cyanide monomer-α-methyl styrene copolymer and a vinyl cyanide monomer-vinyl cyanide monomer-vinyl cyanide monomer copolymer, which is analyzed by NMR, in the heat-resistant SAN resin is 10% by weight or less.

20. A heat-resistant SAN resin composition, comprising 20 to 30 parts by weight of a heat-resistant SAN resin prepared by the method of claim 1 and 70 to 80 parts by weight of a vinyl cyanide compound-conjugated diene compound-aromatic vinyl compound copolymer resin.

* * * * *